(Model.)
H. F. DUNHAM.
SURVEYOR'S INSTRUMENT.
No. 303,269. Patented Aug. 12, 1884.
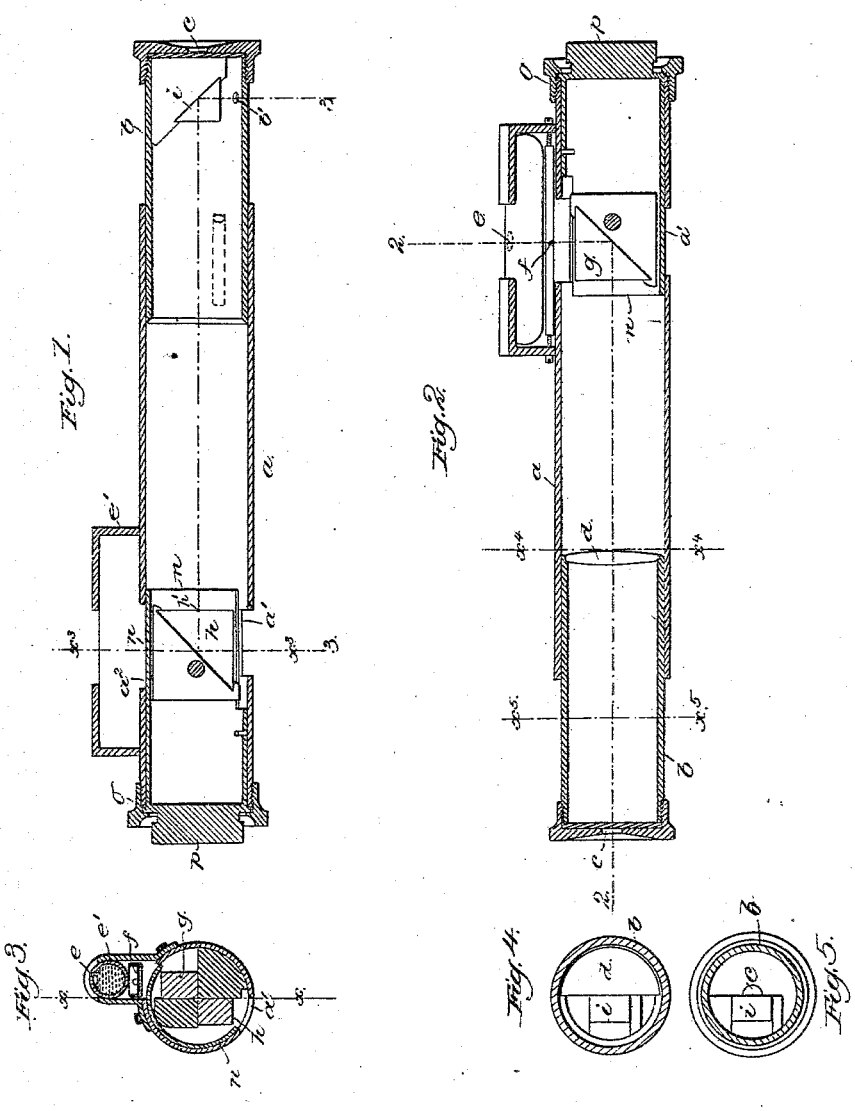
Witnesses.
John F. C. Preinkert
B. J. Noyes.
Inventor:
Herbert F. Dunham.
By Crosby & Gregory
attys.

UNITED STATES PATENT OFFICE.

HERBERT F. DUNHAM, OF CLEVELAND, OHIO.

SURVEYOR'S INSTRUMENT.

SPECIFICATION forming part of Letters Patent No. 303,269, dated August 12, 1884.

Application filed July 30, 1883. (Model.)

*To all whom it may concern:*

Be it known that I, HERBERT F. DUNHAM, of Cleveland, county of Cuyahoga, State of Ohio, have invented an Improvement in Surveyors' Instruments, of which the following description, in connection with the accompanying drawings, is a specification, like letters on the drawings representing like parts.

My invention, relating to a pocket or small portable instrument such as used by surveyors in preliminary work, has for its object to produce in a single instrument a more convenient level than those heretofore used, and also devices that may be used for extending a line or for laying out a right angle.

Pocket-levels as heretofore constructed have consisted of a small tube or telescope adapted for viewing an object through them or sighting a point in line with the axis of the tube, which is provided with a level-tube and bubble, and contains a suitable prism or mirror to reflect the beam of light passing vertically through the said bubble along the axis of the tube to the eye, so that the said bubble is seen apparently superimposed upon the object seen directly through the tube or instrument, which, when constructed and operating in this manner, has a very small field of view, unless the instrument is of considerable size. I have discovered that a smaller and more convenient instrument may be produced by closing the forward end of the tube and using it merely for seeing the level-bubble with the eye that looks into the tube, while the object that is to be sighted or selected at the level of the eye of the observer is viewed by the other eye not looking through the instrument, and, owing to the natural relation of the human eyes or muscles controlling their movement, by which it is impossible to move one eye in one direction and at the same time move the other eye independently in another direction—or, in other words, to look in more than one direction at one time—the object that is seen with the naked eye in apparent coincidence with the level-bubble seen with the eye looking into the instrument will be on a level with the eye of the observer, and it will be seen that the field of view is the same as that of the naked eye. In other words, the instrument is used to direct the line of binocular vision in a horizontal direction. In addition to the prism or mirror for directing the beam of light passing through the level-bubble to the eye, a similar prism or mirror is employed for reflecting the beam of light passing through the axis of the tube at a right angle through an opening in the side of the said tube opposite the level-bubble, so that the eye looking into the tube and through the said prism will see an object at right angles to the direct line of vision through the tube, so that the observer looking with one eye into the tube and directly forward with the other eye, will see two objects in apparent coincidence, which determine two lines at right angles to one another, intersecting at the point where the observer stands. A movable screen is employed for shutting out the lateral beam passing through one or the other of the said prisms, which are adjacent to one another at either side of the middle of the tube, thus confining the vision to but one of the said prisms at one time. Co-operating with the prism near the forward end of the tube for seeing through an aperture in the side thereof, on a line at right angles to its axis, is a second mirror or prism, and a lateral opening in the side of the tube near the rear or eye-piece end, the two prisms acting to turn the beam twice at right angles, or in a directly-opposite direction to that in which the eye of the observer is apparently looking, so that, looking through the instrument with one eye, an object will be seen at the rear in apparent coincidence with an object seen with the naked eye in the front of the observer, the line connecting the said objects passing through the point where the observer stands.

Figure 1 is a longitudinal section in line $x$ $x$, Fig. 3, of a surveyor's instrument embodying this invention, showing the parts on one side—namely, the left-hand side in Fig. 3 of the middle of the instrument—that are used for extending lines or laying out right angles; Fig. 2, a section in the same plane, but showing the parts at the other side of the middle of the instrument, which are used for leveling or determining a horizontal line of vision; and Figs. 3, 4, and 5, transverse sections on lines $x^3$ $x^4$ $x^5$, respectively.

The instrument consists, essentially, of a main tube, $a$, closed at its forward end, and provided at its rear end with a sliding tube or eye-piece, $b$, having an aperture, $c$, through which to look into the tube in the line of its axis, and a half-lens, $d$, at one side of the middle of the tube or instrument, for producing at the eye a magnified image of the level-bubble $e$ and cross-wire $f$ of an attached level tube and case, $e'$, which are viewed by the eye looking into the eye-piece by means of a reflecting-prism, $g$, for turning the beam of light at right angles, as shown by the dotted line 2, Fig. 2. The tube $a$ is provided with a second reflecting-prism, $h$, at the other side of its middle, adapted to reflect a beam at right angles to the axis of the tube on the opposite side from the level $e'$, the said tube being provided with an opening, $a'$, through which the beam enters, and which constitutes the object or field opening. The eye-piece tube $b$ is also provided with a reflecting-prism, $i$, on the same side of the middle of the tube as the prism $h$, and the said tube $b$ is provided with a sight-aperture, $b'$, in its side opposite the said prism, so that a beam entering through the opening $a'$ is reflected by the prism $i$ to the one, $h$, and then out through the aperture $b'$, in the opposite direction to that in which it entered the opening $a'$, as shown by the dotted lines 3, Fig. 1. The forward end of the tube $a$ is provided with a shield or cover, $n$, shown as a portion of a tubular piece entering the forward end of the tube $a$, and held therein by a coupling, $o$, the end of the said tubular piece being provided with a knob, $p$, by which it may be turned a short distance within the tube $a$, so as to cover one or the other of the apertures in the side of the tube $a$, it being shown in Figs. 1 and 3 in the position to cover the aperture $a^2$, through which the level is viewed, and to uncover the aperture $a'$, and in Fig. 2 as in the position to cover the aperture $a'$ and uncover the aperture $a^2$, through which the level is viewed.

When the shield $n$ is in the position shown in Figs. 1 and 3, the user of the instrument, looking in at the aperture $c$ in the eye-piece, will see the light entering the opening $a'$ in the side of the tube $a$, and reflected from the prism $h$, thus being able to see an object in a line at right angles to the axis of the tube; and if he looks through the tube with one eye and looks directly forward with the other eye he will be able to find an object in front of him, seen with his naked eye, and one at right angles to him, seen through the instrument, which will apparently coincide or be superimposed one upon the other, the said objects thus determining two lines at right angles to one another, intersecting nearly at the point where he stands, the distance between his eyes and between the aperture $c$ and prism $h$ coming in as errors, which are, however, of no importance in such preliminary work as can be done by an instrument of this character.

The tube of the instrument is of such length as to afford sufficient distance between the apertures $a'$ $b'$ to cause the rearwardly-reflected line of vision to pass by the observer's head or ear.

In order to extend a line which has already been determined from some points in the rear to the point where the observer stands, the instrument is placed with the aperture $b'$ at one eye—for instance, the left eye when using the apparatus as shown in Fig. 1, taken as a plan view—and the observer finds the object behind him, as seen on the broken line 3, reflected twice by the prisms $h$ and $i$, and then, looking forward with his other or right eye, finds an object which apparently coincides or is in line with the object thus seen behind him through the instrument, and the said object thus seen in front will be in the extension of the line; or, if the operator desires to place himself between two objects—one at the front and one at the rear—he will view the one at the rear through the instrument, and will move about until its image appears to coincide with the point or object seen in front with the naked eye.

If desired to insure greater accuracy in defining an object in laying out a right angle, the opening $a'$, or the portion of the screen $n$ co-operating with it, may be made narrower, or provided with a cross-wire; or a cross-line may be employed on the prism $h$, as shown at $h'$.

A pocket or hand instrument comprising both a level-tube and sighting device and means for aligning or extending a previously-determined line is of very great convenience, as the aligning device may first be used to find or determine a point in a line to be extended, and the leveling device immediately used to determine the difference in level between the point where the observer is standing and the point previously found or determined by the use of an aligning device.

I claim—

1. A surveyor's pocket or hand instrument composed of a tube closed at its forward end, and provided with two lateral openings and reflectors co-operating therewith to direct a beam entering at right angles to the axis along the said axis, the tube being provided at one of the said openings with a level-tube, and having at its other end an eye-piece, the said reflectors and openings having a movable shield or screen operating in combination therewith, substantially as described.

2. The main tube closed at its forward end, combined with a reflector and a level-tube on the said case, and an eye-piece at its rear end, the said devices co-operating with one eye of the user to determine a horizontal line of vision in which an object may be selected or sighted by the other eye, substantially as described.

3. As an improved article of manufacture, the surveyor's instrument comprising a tube, $a$, and eye-piece $b$, the half-lens, reflector $g$, and level-tube, and the reflectors $h$ and $i$, and corresponding lateral apertures, and the screen for cutting off the light from one or the other of the said reflectors $g$ and $h$, substantially as described.

4. As an improved article of manufacture, a surveyor's pocket or hand instrument comprising a tube with lateral sight-apertures, and a pair of reflecting-surfaces co-operating therewith, as described, and a level-tube and reflector co-operating therewith, the said parts being all connected together with a definite relation to one another, constituting a single compact instrument whereby an operator is enabled, without change of position, to determine the alignment of different points and ascertain their difference in level, substantially as and for the purpose described.

In testimony whereof I have signed my name to this specification in the presence of two subscribing witnesses.

HERBERT F. DUNHAM.

Witnesses:
   JOS. P. LIVERMORE,
   W. H. SIGSTON.